Jan. 10, 1956 C. E. ATKINS 2,730,629
LOW VOLTAGE PHOTOELECTRIC CONTROL CIRCUIT
Filed Dec. 19, 1952 2 Sheets-Sheet 2
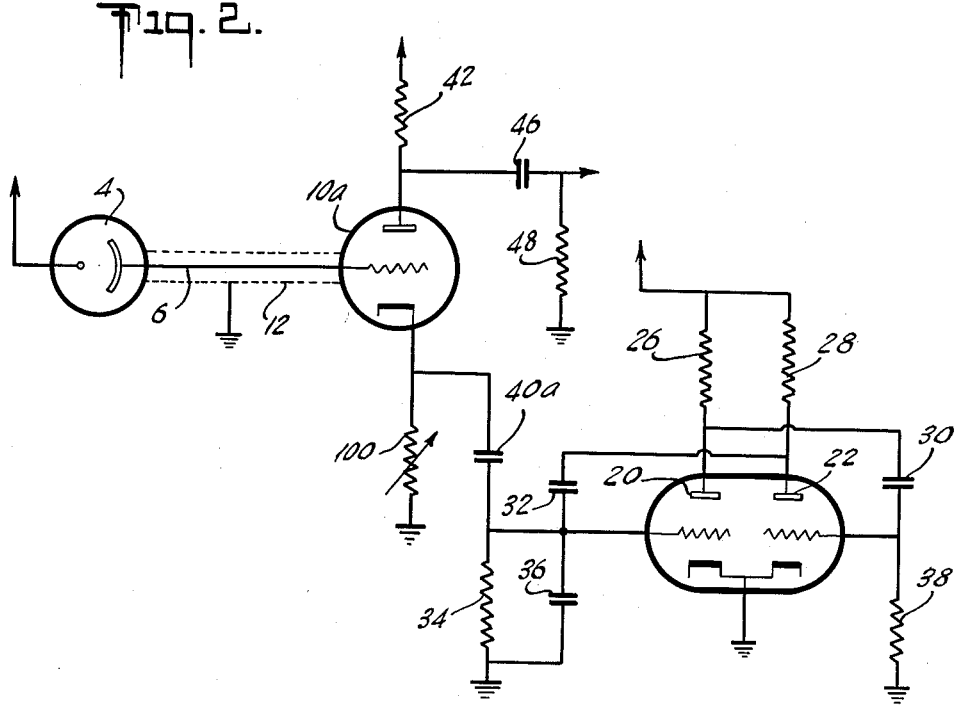
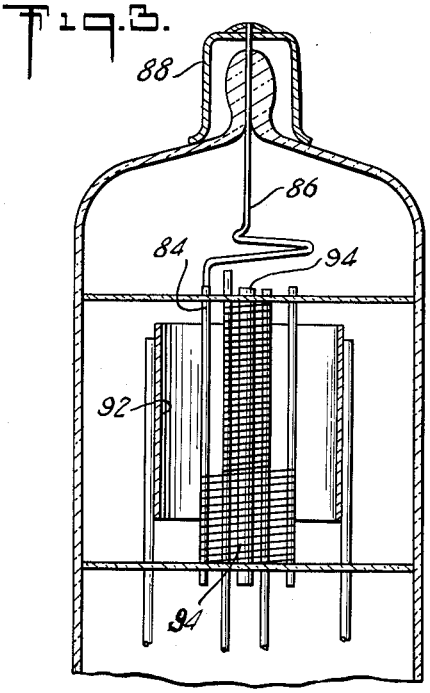
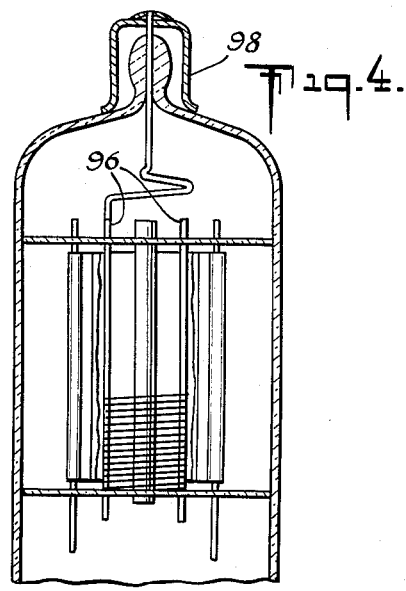
INVENTOR
*CARL EDWARD ATKINS*
BY
ATTORNEYS United States Patent Office 2,730,629
Patented Jan. 10, 1956

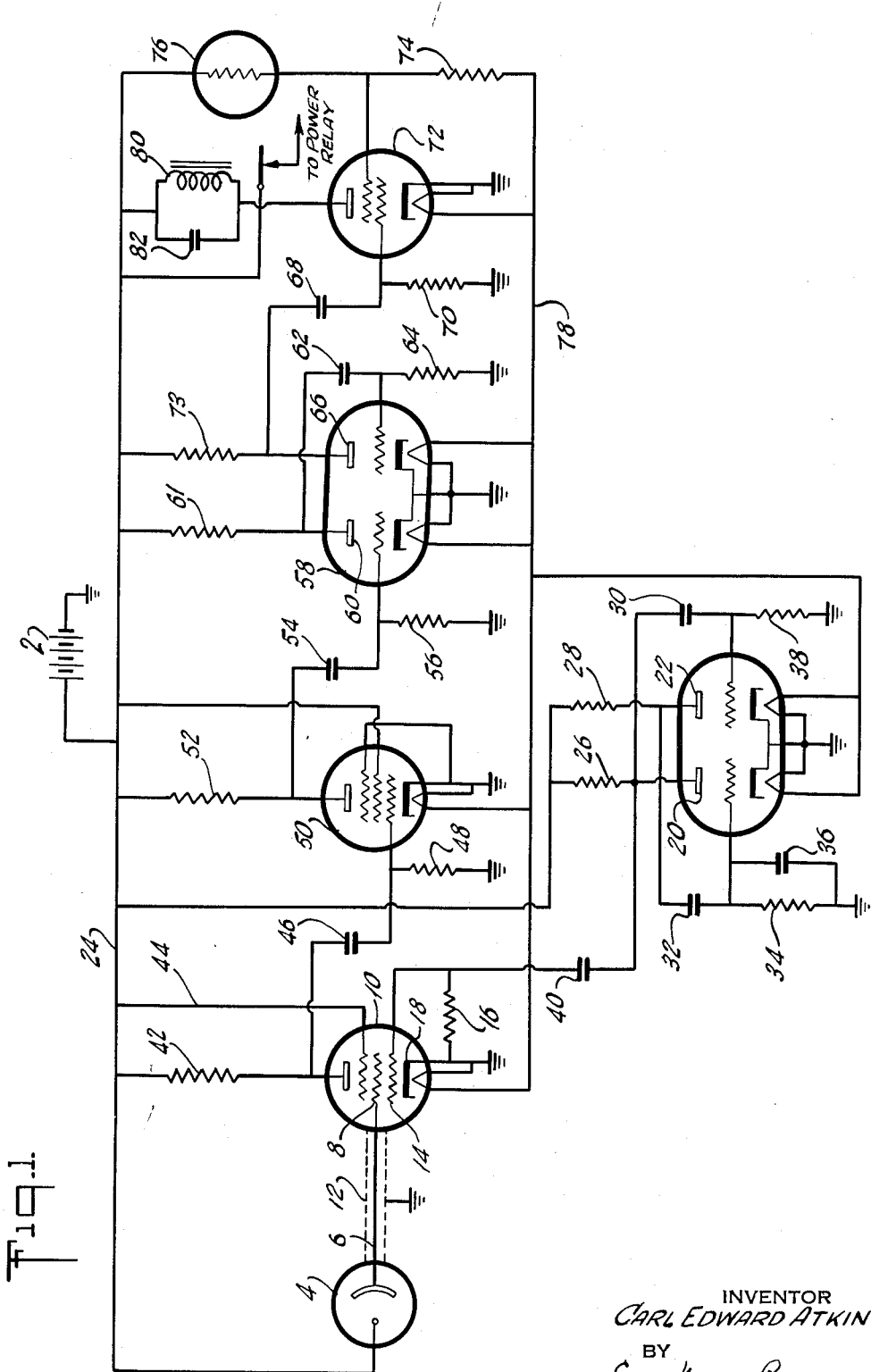

2,730,629
LOW VOLTAGE PHOTOELECTRIC CONTROL CIRCUIT

Carl E. Atkins, Bloomfield, N. J., assignor to Tung-Sol Electric Inc., a corporation of Delaware Application December 19, 1952, Serial No. 326,809

9 Claims. (Cl. 250—214)

The present invention relates to photoelectric control circuits and comprises a novel circuit of this type suitable for operation of a relay or the like and employing as the light-sensitive element a simple two-electrode photoelectric tube. The circuit of the present invention is of the type of that disclosed and broadly claimed in my copending application Serial No. 297,946, filed July 9, 1952, entitled "Light Responsive Circuit," now abandoned, in that it includes means for accumulating small photoelectric currents and for intermittently releasing the accumulated charge to provide a pulsating current varying with the intensity of the light incident on the photo cathode of the tube and suitable for amplification by alternating current techniques.

Like the circuits specifically described in the said copending application, the circuit of the present invention is particularly adapted for use in automobiles for automatic dimming of headlights in response to reception of light from the headlights of approaching cars. The new circuit differs in a number of important respects from the specific circuits of the said application. One important feature of the new circuit is that it is adapted to operate on low voltage, of the order obtainable from car carried storage batteries. Thus no vibrator power supply or other means for obtaining high operating voltages is required. Another novel feature of the invention is the coupling between the photoelectric cell and the current accumulator which eliminates delay between the discharge of the accumulating means and application of the resulting voltage pulses to the amplifier without interfering with the stability of the system. Another feature of the invention is the means for introducing into the gating tube used for discharge of the accumulator a measure of amplification. Other features of the new circuit, including novel means for stabilizing the system to prevent change in amplification with variation in battery voltage and alternative arrangements for control of the gating tube, will appear as the description proceeds.

In the new circuit there is a two-electrode photoelectric tube, preferably a hard tube such as a 922, which is connected through a lead provided with a grounded shield to a grid of a gating tube. The gating tube is intermittently triggered to discharge through the tube and through an impedance any charge accumulated on the distributed capacitor comprising the grounded shield and lead. An alternating current amplifier is fed by the output of the gating tube, and a relay control tube is so connected to the output of the amplifier as to have the current therethrough decrease with increase in signal. An oscillatory circuit is employed for triggering the gating tube. Operating voltage for the amplifier tube, for the gating tube, and for the tubes of the oscillatory circuit is supplied from a 12-volt battery. In the preferred embodiment of the invention the gating tube is a triode and the photo cathode of the photoelectric tube is coupled to the control grid thereof. Preferably the triode is one in which the control grid is relatively widely spaced from the cathode and from the anode and the terminals of the tube are so arranged as to avoid leakage currents.

For a better understanding of the invention and of the circuits embodying the same, reference may be had to the accompanying drawings, of which—

Fig. 1 is a circuit diagram of a low voltage system embodying the invention;

Fig. 2 is a circuit diagram representing an alternative arrangement for triggering the gating tube, the gating tube in this instance being a triode;

Fig. 3 illustrates a tetrode particularly designed for use as the gating tube in the circuits of Figs. 1 and 2; and Fig. 4 illustrates diagrammatically a triode designed for use as the gating tube in the circuit of Fig. 2.

As heretofore indicated, the circuit of the invention is adapted to operate on a 12-volt storage battery and this battery is indicated in Fig. 1 by the reference numeral 2. The negative terminal of the battery 2 is grounded and the positive terminal connected to the anode of a photoelectric tube 4 such as an RCA-922. The photo cathode of the tube 4 is connected by a lead 6 to the No. 2 grid 8 of a pentode 10, which may be for example a 6AU6 and the lead 6 is shielded by a grounded cable 12, the lead 6 and cable 12 comprising a distributed capacitor for accumulating the minute current through the tube 4 when light is incident on the photo cathode thereof. Pentode 10 serves as a combined gating tube and amplifier. Normally the tube is blocked by negative potential appearing at the No. 1 grid 14 thereof due to a high resistance 16 interconnecting the grid 14 and grounded cathode 18 of the tube. Means, specifically a multi-vibrator circuit, is provided for intermittently raising the potential of the grid 14 to permit the gating tube to pass current if and when a sufficient charge has accumulated on the distributed capacity. The multi-vibrator circuit comprises a double triode such as a 12AU7 to the anodes 20 and 22 of which positive potential is supplied from the battery 2 through a lead 24 and the respective potential dropping resistors 26 and 28. The anode 20 is connected through a condenser 30 to the control grid associated with anode 22 and, similarly, anode 22 is connected to the control grid associated with anode 20 through a condenser 32. A bias resistor 34 by-passed by a condenser 36, is connected between the last mentioned grid and ground, and, similarly, a bias resistor 38 is connected between the control grid associated with anode 22 and ground. Both cathodes of the double triode are grounded. Anode 20 is connected through a condenser 40 to grid 14 of the gating tube to apply a positive pulse thereto when the current to anode 20 falls by application of negative potential to the control grid associated therewith.

Positive potential from the battery 2 is applied through lead 24 and a resistor 42 to the anode of the gating tube, the No. 3 grid of the gating tube being maintained at the full voltage of the battery by a lead 44 connected to lead 24. Resistors 42 and 16 are of relatively high resistance, whereas resistors 26 and 28 are of lower resistance. The anode of the gating tube 10 is coupled through a condenser 46 and grid bias resistor 48 with the control grid of an amplifier tube 50, which may be a 6AU6. The anode of amplifier 50 is supplied with energizing potential from the battery 2 through a load resistor 52 and is coupled through a condenser 54 and grid bias resistor 56 to the control grid of the first stage of a double triode 58, such as a 12AU7. The anode 60 of the first stage of tube 58 is connected to the positive terminal of battery 2 through a load resistor 61 and is coupled through a condenser 62 and grid bias resistor 64 to the control grid of the second stage of the tube 58. Both cathodes of the tube 58 are grounded. Resistor 56 is of high resistance, whereas resistor 64 is of very low resistance of the order of 15 K. The anode 66 of the second stage of tube 58 is coupled through a condenser 68 and bias resistor 70 to the control grid of a relay control tube 72, which may be a 6AS5, a potential dropping resistor 73 being conected between anode 66 and the positive terminal of the battery 2. The cathode of the relay control tube 72 is grounded and the screen grid thereof is connected to the junction of a resistor 74 with a ballast tube 76 in series between lead 24 and a lead 78. The cathode heaters of the various tubes of the system are connected in parallel between lead 78 and ground. The output circuit of the relay tube 72 comprises a relay 80 by-passed by a condenser 82.

The operation of the above described circuit will be in part obvious from the foregoing description of the elements thereof. When no light falls on the photo cathode of tube 4 no substantial charge will be accumulated by the capacity comprising the lead 6 and cable 12. Consequently, when a positive pulse from the multi-vibrator circuit appears upon the No. 1 grid of the gating tube, the low potential on grid No. 2 prevents passage of current through the tube. Under these conditions amplifier 50 passes a steady current as does each of the remaining tubes of the system. The current through the relay tube 72 will be sufficient to maintain the relay 80 energized. When, however, light is incident upon the photoelectric tube 4, electrons will leave the photo cathode thereof, charging the distributed capacity and raising the potential of grid 8 of the gating tube. Consequently, when the potential at grid No. 1 is raised by a pulse from the multi-vibrator circuit, negative pulses will appear at the anode of the gating tube and be impressed upon the control grid of tube 50. These negative pulses will appear as amplified positive pulses at the anode of tube 50, which pulses are then amplified by the double triode and appear as amplified positive pulses at the anode 66 of tube 58, varying in magnitude with the intensity of the light incident on the photo tube. As bias resistor 70 is much larger than resistor 73, the grid of the relay tube will be swung negative as a result of the pulses until at a given intensity of the light the relay 80 releases. Release of the relay may be used, for example, to energize a power relay for operation of the dimming switch of an automobile. Once the relay 80 has released it will not pick up until the intensity of the light falling on the photo cell has diminished to a predetermined value susbtantially less than that required for release of the relay. This is because a greater current through the relay winding is required for picking up of its armature than for holding the armature in attracted position. Thus should the lights of an approaching car be dimmed after automatic dimming by the above described circuit, the relay will not pick up until substantially no light falls upon the photo tube 4. This is a useful feature of the circuit as it avoids any danger of immediate release of the dimming switch when the approaching car's headlights are dimmed.

In the specific circuits of the aforementioned copending application, the photo cathode of the photoelectric tube was connected to the anode rather than to a grid of the gating tube, the anode of the gating tube being tied directly to the control grid of the first amplifier or being coupled thereto through a condenser and biasing resistor. When the anode is connected directly to the control grid of the first ampilfier, that grid is floating and hence its potential may vary as the result of stray leakage When a blocking condenser and biasing resistor are employed, a slight delay, because the blocking capacity is not at any direct current potential, result between the start of emission of electrons from the photo cathode and application of negative voltage to the grid of the first amplifier. By the arrangement of the circuit of the present invention, namely the connection of the photoelectric tube to a grid of the gating tube, the control grid of the first amplifier is maintained at a definite direct current potential and delay incident to the use of a blocking condenser is avoided. Moreover, by connecting the photo cathode to a grid of the gating tube, the control grid of the first amamplifier and hence improves the operation of the system. When a pentode is employed for the gating tube, the sensitivity of the tube is improved by the illustrated connection of the No. 3 grid to the positive terminal of the battery. Satisfactory operation can be obtained, however, with this grid tied directly to the anode or maintained at a potential a few volts below that of the battery or even tied directly to the cathode.

When the gating tube is a multi-grid tube of conventional construction, care must be taken to minimize leakage currents between pin terminals the electric potentials of which differ markedly and particularly between the pin terminal of the anode and the pin terminal connected to the photo cathode of the photoelectric tube. A tube construction such as that of the tetrode illustrated in Fig. 3 is particularly suitable for use as the gating tube when pulsing is applied to the No. 1 grid and the light-sensitive element of the photoelectric tube is connected to the No. 2 grid as in the circuit of Fig. 1. The tube of Fig. 3 differs from conventional tetrodes primarily in that the No. 2 grid 84 thereof is connected by an internal lead 86 to a top cap terminal connector 88 while the leads for the remaining electrodes and for the cathode heater are taken out through the press to conventional pin terminals (not shown). The tube could include a No. 3 grid if desired but such grid is preferably omitted as it permits closer spacing of the anode 92 to the cathode 94, thereby increasing the sensitivity of the tube.

The circuit of Fig. 1 has been found to be exceedingly stable and substantially independent of battery voltage fluctuations. This stability is due in large measure to the use of the ballast tube 76 which maintains constant the potential of the screen grid of the relay control tube and maintains constant also the voltage across the cathode heaters.

Another important feature of the circuit of Fig. 1 is the use of the unusually low bias resistor 64 in the last amplifier stage. This low value of bias resistor enables that stage to pass relatively high plate current at the low plate voltage employed in the system.

In Fig. 2 is illustrated an alternative arrangement wherein triggering pulses are applied to the cathode of the gating tube rather than to the No. 1 grid thereof. In Fig. 2 the gating tube 10a is illustrated as a triode. It is preferably of the construction illustrated in Fig. 4, wherein the side rods 96 of the control grid are connected to a top cap 98 of the tube and are spaced substantially midway between cathode and anode to minimize grid-cathode and grid-anode leakage. The grid of tube 10a is connected by the lead 6 to the cathode of the photoelectric tube 4 and this lead is provided with the grounded shield 12 as in the circuit of Fig. 1, the lead and grounded shield serving as a distributed capacity for accumulation of the photoelectric currents. The cathode of the tube 10a is connected to ground through a cathode resistor 100, preferably variable as indicated. A multi-vibrator circuit identified by the same reference numerals as used in Fig. 1 is provided for intermittently triggering the tube 10a. In order, however, that negative pulses rather than positive pulses are received from the multi-vibrator circuit, the grid associated with anode 29 is connected through a condenser 40a to the cathode of the gating tube 10a. The anode of the gating tube is connected to the grid of the first amplifier through condenser 46, as in the circuit of Fig. 1. The rest of the circuit being substantially identical with that of Fig. 1, has not been illustrated in Fig. 2.

With the circuit of Fig. 2, application of negative pulses to the cathode of the gating tube unblocks that tube, permitting negative pulses to appear at the anode of the gating tube when a sufficient charge has been accumulated upon the distributed capacity to raise the potential of the control grid of the gating tube. The functioning of the circuit being identical with that already described in connection with Fig. 1 needs no further explanation. Although it is preferable that the gating tube be a triode, a tetrode or pentode could be employed if desired. If a tetrode is used, the photo cathode would be connected to the No. 2 grid as in the embodiment of the invention illustrated in Fig. 1. The No. 1 grid could be tied directly to the cathode or could be grounded, or could be connected to ground through a bias resistor. With a pentode the No. 3 grid could be maintained at a positive potential, either that of the anode or that of the supply battery, or it could be tied directly to the cathode. The optimum connections for the grids are determined in large part by the characteristics of the particular tube employed as the gating tube.

For best operation of the circuit, the gating tube should be one having low cathode to plate capacity and low leakage, such as illustrated in Fig. 4.

Although it is believed that sufficient indication of the circuit elements of Fig. 1 has been given in connection with the description of the circuit to enable one skilled in the art to build an operative system, the following table giving detailed information of the elements of a specific circuit is presented as illustrative of a stable and sensitive system suitable for use for automatic dimming of automobile headlights. It will be understood that the invention is not limited to the use of the specific circuit constants given in the table.

*Table of circuit elements*

| | | |
|---|---|---|
| Battery voltage | volts | 12 |
| Gating tube 10 and tube 50 | | 6AU6 |
| Resistor 16 | meg | 8.2 |
| Resistors 42, 48 | meg | 22 |
| Condenser 46 | μf | .005 |
| Resistor 52 | k | 220 |
| Condenser 54 | μf | .05 |
| Resistors 34, 38 and 56 | meg | 5.6 |
| Resistor 61 | k | 100 |
| Condensers 62 and 68 | μf | .1 |
| Resistor 73 | k | 33 |
| Tube 58 and M. V. tube | | 12AU7 |
| Resistor 64 | k | 15 |
| Resistor 70 | k | 470 |
| Tube 72 | | 6AS5 |
| Resistors 26 and 28 | k | 33 |
| Condensers 40 and 36 | μf | .005 |
| Condenser 30 | μf | .01 |
| Condenser 32 | μf | .00025 |

The invention has now been described with reference to a specific circuit and the preferred numerical values of the various elements have been indicated. Alternative arrangements for triggering the gating tube have been indicated and optimum designs of the gating tube have been suggested. It will be apparent from the foregoing that the invention comprises a stable, low voltage system for converting small photoelectric currents to pulsating currents suitable for amplification by alternating current techniques and adapted for control of relays or the like. By so designing the circuit as to be operative at the low voltage of car batteries, an economical system for use in the automatic dimming of headlights is obtained. The circuit as described requires no transformers or other elements of high voltage systems. It may be readily adjusted for optimum sensitivity and is reliable in operation.

The following is claimed:

1. A photoelectric control circuit comprising a low voltage source of direct current, a two-electrode photoelectric tube, a gating tube having a cathode, at least one grid and an anode, a lead provided with a grounded shield connecting one electrode of said photoelectric tube with a grid of said gating tube, one terminal of said source being connected to the other electrode of said photoelectric tube, a circuit including a dropping resistor and said source connected across said gating tube, means normally blocking said gating tube and means for intermittently rendering said blocking means inoperative whereby photoelectric currents generated by light incident on the photo cathode of the photoelectric tube and accumulated by the distributed capacity comprising said lead and shield will be intermittently discharged through said gating tube and produce at the anode thereof pulses varying in amplitude with the intensity of the incident light.

2. The circuit according to claim 1 including means coupled to the anode of said gating tube for amplifying pulses appearing thereat, a normally energized relay control tube having a cathode, an anode and at least one grid, a grid bias resistor connected between said grid of the relay control tube and the cathode thereof, and means coupling said amplifying means to said grid of the relay control tube for reducing the current through the relay control tube with increase in pulse amplitude.

3. The circuit according to claim 2 wherein said relay control tube has a second grid, and wherein a ballast tube and a resistive impedance are connected in series across said source, said second grid being connected to the junction of said ballast tube with said resistive impedance.

4. The circuit according to claim 3 wherein said amplifying means includes at least one electronic tube having a cathode heater and wherein said gating tube and said relay tube have cathode heaters, said heaters comprising the resistive impedance in series with said ballast tube across said source.

5. The circuit according to claim 1 wherein the means normally blocking the gating tube is a resistor connected between the cathode of that tube and the negative terminal of said source and wherein said means for intermittently rendering said blocking means inoperative comprises an oscillatory circuit connected to impress negative pulses on the cathode of the gating tube.

6. The circuit according to claim 1 wherein said gating tube has at least two grids, said means normally blocking said gating tube comprising a bias resistor connected to the grid closer to the cathode, the lead provided with a grounded shield being connected to the other grid, and wherein said means for intermittently rendering said blocking means inoperative comprises an oscillatory circuit connected to impress positive pulses on the first grid.

7. The circuit according to claim 1 wherein said gating tube is a triode having a single grid and a top cap connector, said grid being internally connected to said top cap for connection to said lead provided with a grounded shield, said blocking means being connected to the cathode of said triode.

8. The circuit according to claim 1 wherein said gating tube is a tetrode having a No. 1 and a No. 2 grid and a top cap connector, the No. 2 grid being internally connected to said top cap for connection to said lead provided with a grounded shield, said blocking means being connected to said No. 1 grid.

9. A photoelectric control circuit comprising a low voltage source of direct current, a two-electrode photoelectric tube, a gating tube having a cathode, at least one grid and an anode, said gating tube having a top cap to which said grid is internally connected, a lead connecting one electrode of said photoelectric tube with the top cap of said gating tube, one terminal of said source being connected to the other electrode of said photoelectric tube, a circuit including a dropping resistor and said source connected across said gating tube, means normally blocking said gating tube, means for intermittently rendering said blocking means inoperative, alternating current amplifying means coupled to the anode of said gating tube, a normally energized relay control tube having a cathode, an anode and at least one grid, a grid bias resistor connected between said grid of the relay control tube and the cathode thereof, and means coupling said amplifying means to said grid of the relay control tube.

References Cited in the file of this patent

UNITED STATES PATENTS

| 2,178,985 | Blumlein | Nov. 7, 1939 |
| 2,578,525 | Erickson | Dec. 11, 1951 |
| 2,645,724 | Rajchman et al. | July 14, 1953 |